(12) United States Patent
Yosui et al.

(10) Patent No.: US 8,922,444 B2
(45) Date of Patent: Dec. 30, 2014

(54) ANTENNA DEVICE AND MOBILE TERMINAL

(75) Inventors: Kuniaki Yosui, Kyoto (JP); Hiromitsu Ito, Kyoto (JP); Hiroyuki Kubo, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 249 days.

(21) Appl. No.: 13/428,552

(22) Filed: Mar. 23, 2012

(65) Prior Publication Data

US 2012/0176283 A1 Jul. 12, 2012

Related U.S. Application Data

(63) Continuation of application No. PCT/JP2010/057946, filed on May 11, 2010.

(30) Foreign Application Priority Data

Sep. 25, 2009 (JP) ................................ 2009-221627

(51) Int. Cl.
| | | |
|---|---|---|
| *H01Q 7/08* | (2006.01) | |
| *H01Q 1/24* | (2006.01) | |
| *G06K 19/077* | (2006.01) | |
| *H01Q 7/06* | (2006.01) | |
| *H01Q 1/22* | (2006.01) | |

(52) U.S. Cl.
CPC ................. *H01Q 7/06* (2013.01); *H01Q 1/241* (2013.01); *H01Q 7/08* (2013.01); *G06K 19/07779* (2013.01); *H01Q 1/2225* (2013.01)
USPC .......................................... 343/788; 343/702

(58) Field of Classification Search
CPC . G06K 19/07779; H01Q 7/00; H01Q 1/2225; H01Q 1/2216; H01Q 1/38
USPC .......................... 343/787, 788, 895, 866, 867
See application file for complete search history.

(56) References Cited

U.S. PATENT DOCUMENTS 7,061,434 B2 * 6/2006 Aoyama et al. ............... 343/702
7,148,851 B2 * 12/2006 Takaki et al. .................. 343/702
(Continued)

FOREIGN PATENT DOCUMENTS

| CN | 101069323 A | 11/2007 |
|---|---|---|
| CN | 101479886 A | 7/2009 |

(Continued)

OTHER PUBLICATIONS

The first Office Action issued by the State Intellectual Property Office of People's Republic of China on Nov. 5, 2013, which corresponds to Chinese Patent Application No. 201080042271.3 and is related to U.S. Appl. No. 13/428,552.

(Continued)

*Primary Examiner* — Dameon E Levi
*Assistant Examiner* — Hasan Islam
(74) *Attorney, Agent, or Firm* — Studebaker & Brackett PC

(57) ABSTRACT

This disclosure provides an antenna device including an antenna coil having a plate-shaped magnetic core with first and second main surfaces and a coil conductor wound around the magnetic core, and a flat conductor adjacent to the antenna coil. For instance, the flat conductor can be a ground electrode formed on or within a circuit substrate. The coil conductor includes a first conductor portion adjacent to the first main surface of the magnetic core and a second conductor portion adjacent to a second main surface thereof. The first conductor portion of the antenna coil is closer to an end portion of the flat conductor than the second conductor portion, with the second main surface of the magnetic core facing the flat conductor.

26 Claims, 5 Drawing Sheets

(56) References Cited

U.S. PATENT DOCUMENTS

| | | | |
|---|---|---|---|
| 7,495,625 B2 * | 2/2009 | Endo et al. | 343/788 |
| 7,642,970 B2 * | 1/2010 | Aoyama et al. | 343/702 |
| 8,179,332 B2 * | 5/2012 | Kubo et al. | 343/788 |
| 2004/0075616 A1 | 4/2004 | Endo et al. | |
| 2005/0001031 A1 | 1/2005 | Akiho et al. | |
| 2005/0007296 A1 | 1/2005 | Endo et al. | |
| 2007/0205291 A1 | 9/2007 | Aramaki et al. | |
| 2009/0096694 A1 * | 4/2009 | Ito et al. | 343/788 |
| 2009/0167624 A1 | 7/2009 | Aramaki et al. | |
| 2010/0309081 A1 | 12/2010 | Kobayashi et al. | |
| 2012/0112978 A1 | 5/2012 | Ito et al. | |

FOREIGN PATENT DOCUMENTS

| | | |
|---|---|---|
| JP | 2000-048152 A | 2/2000 |
| JP | 2001-028510 A1 | 1/2001 |
| JP | 2002-290131 A | 10/2002 |
| JP | 2002-325013 A | 11/2002 |
| JP | 2004-348497 A | 12/2004 |
| JP | 2007-013662 A | 1/2007 |
| JP | 3956172 B2 | 8/2007 |
| JP | 3975918 B2 | 9/2007 |
| JP | 2008-035459 B2 | 2/2008 |
| JP | 2008-036459 A | 2/2008 |
| JP | 2008-133018 A | 6/2008 |
| WO | 02/50951 A1 | 6/2002 |
| WO | 2009/078214 A1 | 6/2009 |

OTHER PUBLICATIONS

International Search Report; PCT/JP2010/057946; Aug. 17, 2010.
Written Opinion of the International Searching Authority; PCT/JP2010/057946; Aug. 17, 2010.

* cited by examiner

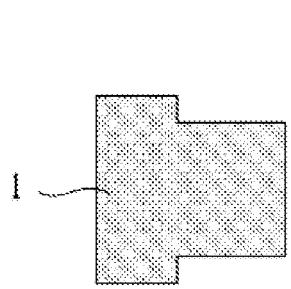 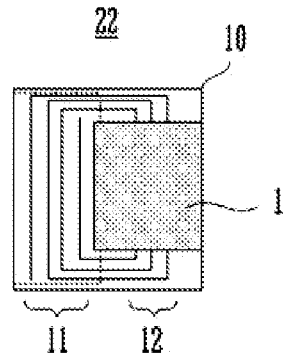
FIG.7A  FIG.7B
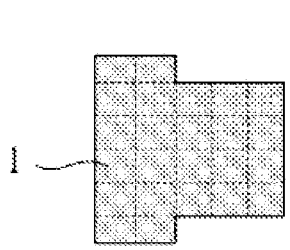 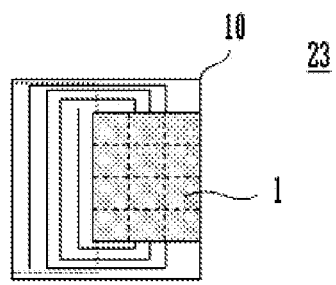
FIG.8A  FIG.8B
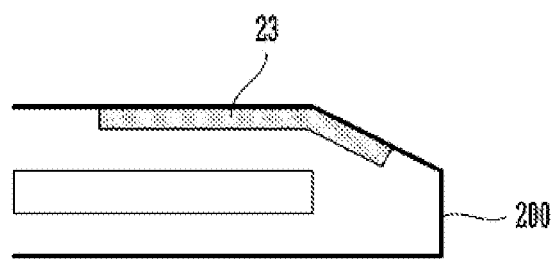
FIG.9

ANTENNA DEVICE AND MOBILE TERMINAL

CROSS REFERENCE TO RELATED APPLICATIONS

The present application is a continuation of International Patent Application No. PCT/JP2010/057946 filed on May 11, 2010, which claims priority to Japanese Patent Application No. 2009-221627 filed on Sep. 25, 2009, the entire contents of each of these applications being incorporated herein by reference.

FIELD OF THE INVENTION

The present invention relates to an antenna device for use in, e.g., RFID (radio frequency identification) systems, which communicate with external devices using electromagnetic signals, and a mobile terminal including the same.

BACKGROUND

Japanese Patent No. 3975918 (Patent Literature 1) discloses an antenna device included in a mobile electronic apparatus for use in RFID systems. The antenna device of Patent Literature 1 includes an asymmetrical coil where two positions are opposed to each other with the center of a coil winding area therebetween and the winding pitch varies between the two positions. On a side having a larger winding pitch, a magnetic body is disposed on the back of a main surface opposed to an IC card; on a side having a smaller winding pitch, a magnetic body is disposed on the main surface opposed to the IC card.

SUMMARY

The present disclosure provides an antenna device that can reduce the degradation of communication performance depending on the angle which the antenna device forms with the reading surface of a reader/writer, and a mobile terminal including the same.

In one aspect of the disclosure, an antenna device includes an antenna coil and a flat conductor adjacent to the antenna coil. The antenna coil includes a plate-shaped magnetic core having first and second main surfaces and a coil conductor wound around the magnetic core. The antenna coil is provided at or proximal to (i.e., near) an end portion of the flat conductor and on or over a surface of the flat conductor opposite to a surface thereof facing an antenna of a communication partner (e.g., a reader/writer). First and second conductor portions of the coil conductor are provided in positions that do not overlap each other in a perspective plan view of the magnetic core (i.e., in a view from the direction of a normal to the first main surface or second main surface). The first conductor portion is adjacent to the first main surface of the magnetic core, and the second conductor portion is adjacent to the second main surface thereof. The second main surface of the magnetic core faces the flat conductor. The first conductor portion is closer to the end portion of the flat conductor than the second conductor portion.

In a more specific embodiment, the magnetic core may be a sheet-shaped mixture of a magnetic powder and a resin material.

In another more specific embodiment, the magnetic core may be a plurality of sintered magnetic pieces.

In yet another more specific embodiment, a portion of the magnetic core adjacent to the first conductor portion is thicker than the other portions thereof.

In still another more specific embodiment, an end portion of the magnetic core close to the first conductor portion is bent at a position outside an end portion of the flat conductor toward the flat conductor.

In another aspect of the disclosure, a mobile terminal can include a case and any one of the above-mentioned antenna devices contained in the case.

BRIEF DESCRIPTION OF DRAWINGS

FIG. 7A is a plan view of a magnetic core 1 included in an antenna coil according to a second exemplary embodiment, and FIG. 7B is a plan view of an antenna coil 22 according to the second embodiment.

FIG. 8A is a plan view of a magnetic core 1 included in an antenna coil according to a third exemplary embodiment, and FIG. 8B is a plan view of an antenna coil 23 according to the third embodiment.

FIG. 9 is a drawing showing the state of the disposition of the antenna coil in a mobile terminal.

DETAILED DESCRIPTION

The inventors realized that when an electronic apparatus including the antenna device such as described in Patent Literature 1 is held over a reader/writer, communication may be impossible depending on the angle which the antenna device of the electronic apparatus forms with the antenna device of the reader/writer. That is, when the mobile terminal communicates with an IC card in parallel therewith, no significant problem occurs; when the mobile terminal communicates with a fixed reader/writer or the like, the position (angle) of the mobile terminal relative to the reader/writer varies, disadvantageously degrading communication performance.

Figure 1A:
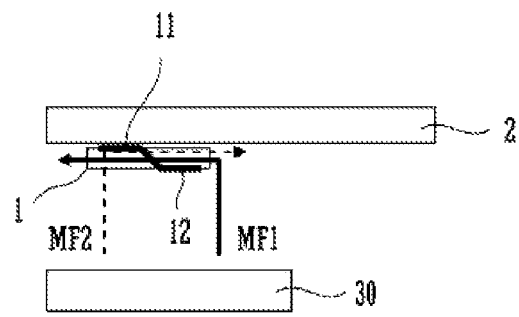
FIG. 1 includes drawings showing magnetic fluxes interlinked with the coil of an antenna device similar to the antenna device described in Patent Literature 1 when a change is made to the angle which the antenna device forms with the antenna device of a reader/writer.
Figure 1B:
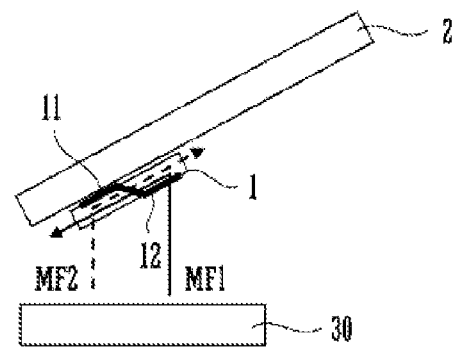

For instance, FIGS. 1A and 1B are drawings showing magnetic fluxes interlinked with the coil of an antenna device similar to the antenna device described in Patent Literature 1 when a change is made to the angle which the antenna device forms with the antenna device of a reader/writer. Solid-line arrows and broken-line arrows in FIG. 1 schematically represent the magnetic fluxes.

A first main surface of a magnetic core 1 is adjacent to and faces a flat conductor 2. A first conductor portion 11 of a coil conductor is adjacent to the first main surface of the magnetic core 1. A second conductor portion 12 thereof is adjacent to a second main surface of the magnetic core 1. An antenna coil composed of the magnetic core 1 and the coil conductor is disposed adjacent to an end portion of the flat conductor 2, forming an antenna device.

When the magnetic core 1 and an antenna device 30 of the reader/writer are in parallel with each other, as shown in FIG. 1A, that is, when the angle formed by both the magnetic core 1 and the antenna device 30 is 0°, a magnetic flux (solid line) coming into the right side of the magnetic core 1 is larger than a magnetic flux (broken line) coming into the left side thereof. Thus, electromotive force is generated in the coil.

However, as angles are made from that state (i.e., from the angle of 0°), the magnetic flux coming into the side (right side) of the magnetic core 1 distant from the reader/writer is reduced and the magnetic flux coming into the side (left side) thereof adjacent to the reader/writer is increased, as shown in FIG. 1B. Thus, the right and left magnetic fluxes completely equal each other at a certain angle, generating a point where no electromotive force is generated. Communication is impossible in such a state.

Figure 2:
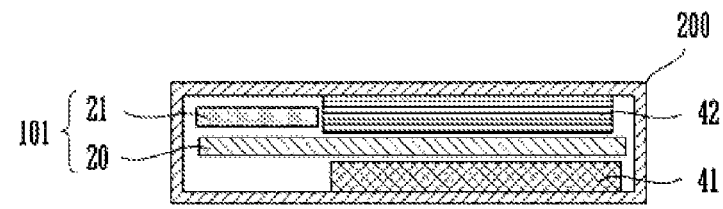
FIG. 2 is a sectional view showing the internal configuration of a mobile terminal including an antenna device according to a first exemplary embodiment.

FIG. 2 is a sectional view showing the internal configuration of a mobile terminal including an antenna device 101 according to a first exemplary embodiment.

The antenna device 101 is composed of a circuit substrate 20 and an antenna coil 21 disposed within a case 200 of the mobile terminal. A battery pack 41 and a liquid crystal display panel 42 are disposed in positions which do not overlap the antenna coil 21.

Figure 3A:
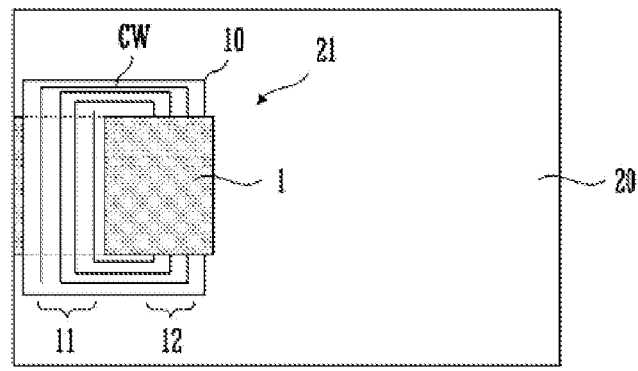
FIG. 3A is a plan view of an antenna device 101.
Figure 3B:
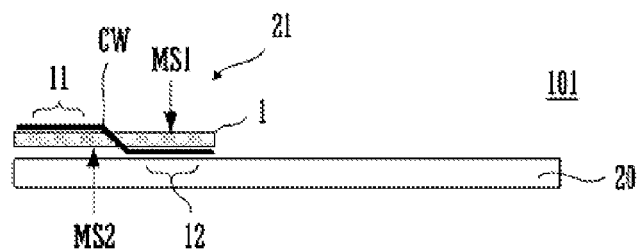
FIG. 3B is a front view thereof.

FIG. 3A is a plan view of the antenna device 101, and FIG. 3B is a front view thereof. As shown in FIGS. 3A and 3B, a magnetic core 1 can be a rectangular plate-shaped ferrite core. A coil conductor CW is wound around the magnetic core 1. Specifically in this example, the coil conductor CW has a shape of a rectangular spiral formed on a flexible substrate 10, and a rectangular aperture is made in the central portion of the spiral. The magnetic core 1 is provided in the aperture.

The coil conductor CW includes a first conductor portion 11 adjacent to a first main surface MS1 of the magnetic core 1 and a second conductor portion 12 adjacent to a second main surface MS2 of the magnetic core 1. The magnetic core 1 and the coil conductor CW form the antenna coil 21.

A ground electrode spreading in the shape of a plane is formed on or within the circuit substrate 20. This ground electrode is a flat conductor according to the present disclosure.

The antenna coil 21 is disposed so that the second main surface MS2 of the magnetic core 1 faces the circuit substrate 20 and so that the first conductor portion 11 is closer to an end portion of the circuit substrate 20 than the second conductor portion 12.

The second conductor portion 12 adjacent to the second main surface MS2 of the magnetic core 1 of the coil conductor CW, and the first conductor portion 11 adjacent to the first main surface MS1 of the magnetic core 1 of the coil conductor CW are disposed in positions which do not overlap each other in a perspective plan view of the magnetic core 1 (i.e., in a view from the direction of a normal to the first main surface MS1 or second main surface MS2 of the magnetic core 1).

Both end portions of the coil conductor CW of the antenna coil 21 are connected to predetermined terminal electrodes on the circuit substrate 20. The illustration of this connection structure is not shown.

Figure 4:
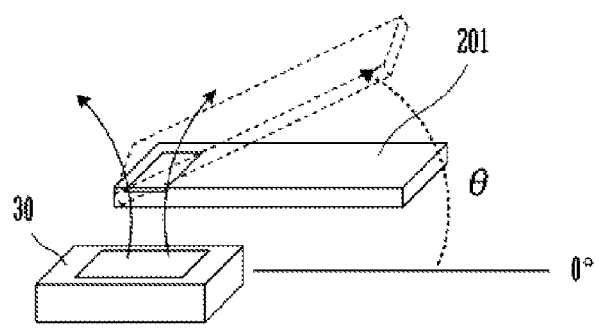
FIG. 4 is a perspective view showing an angle θ, at which a mobile terminal 201 whose case contains the antenna device is held over an antenna device 30 of a reader/writer.

FIG. 4 is a perspective view showing an angle θ, at which a mobile terminal 201 whose case contains the antenna device is held over an antenna device 30 of the reader/writer. As shown in FIG. 2, the circuit substrate 20 is disposed along the case of the mobile terminal. Thus, the disposition of the mobile terminal 201 in parallel with the antenna device 30 of the reader/writer results in the disposition of the antenna device 101 in parallel with the antenna device 30 of the reader/writer. The angle θ here is 0°.

Figure 5:
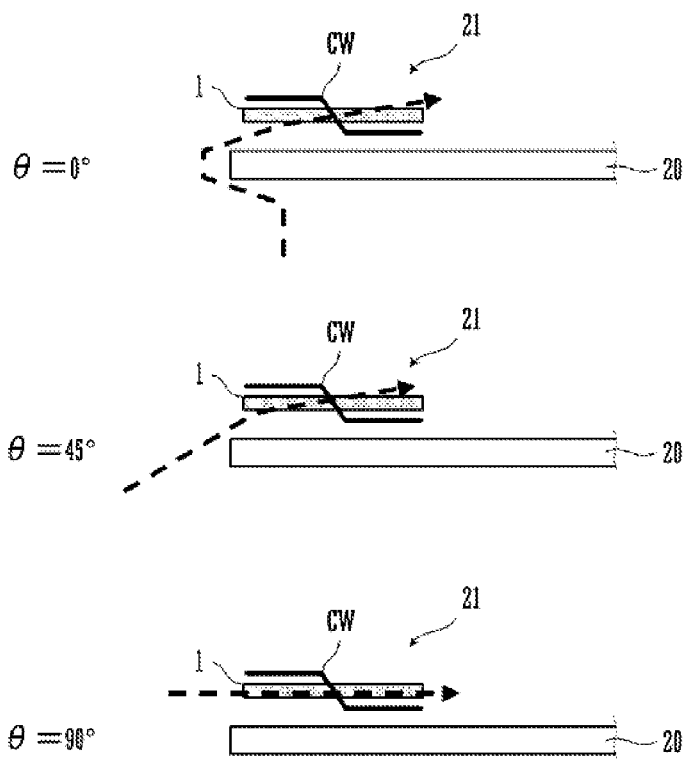
FIG. 5 includes drawings schematically showing the aspect of a magnetic flux passing through an antenna coil when the angle θ shown in FIG. 4 is changed.

FIG. 5 includes drawings schematically showing the aspect of a magnetic flux passing through the antenna coil when the angle θ shown in FIG. 4 is changed to angles ranging from θ=0° to θ=135°. Broken-line arrows in FIG. 5 schematically represent paths of the magnetic flux.

When θ=0°, the magnetic flux from the reader/writer bypasses the circuit substrate 20, comes into one end portion of the magnetic core 1, and passes through the central portion of a coil conductor CW formation area.

When θ=45°, the magnetic flux from the reader/writer comes into the magnetic core 1 in the direction of approximately 45° with respect to the magnetic core 1 and passes through the central portion of the coil conductor CW formation area. Here, the magnetic flux passing through the central portion of the coil conductor CW formation area in an opposite direction as shown in FIG. 1B is extremely small.

When θ=90°, the magnetic flux from the reader/writer comes into one end portion of the magnetic core 1 and goes out of the other end portion thereof, as well as passes through the central portion of the coil conductor CW formation area. Here again, the direction of the magnetic flux passing through the coil conductor CW is the same.

When θ=135°, the magnetic flux from the reader/writer comes into the magnetic core 1 in the direction of approximately 135° with respect thereto and passes through the central portion of the coil conductor CW formation area. Here again, the magnetic flux passing through the coil conductor CW in an opposite direction as shown in FIG. 1B is extremely small.

Accordingly, such a situation does not occur that the magnetic fluxes passing through the magnetic core in both directions cancel out each other, regardless of the value of the angle θ, at which the mobile terminal 201 is held over the antenna device 30 of the reader/writer.

Figure 6:
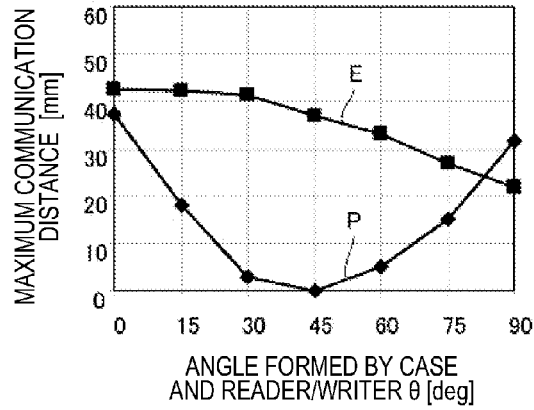
FIG. 6 is a graph showing the relationship between the angle θ, at which the mobile terminal is held over the reader/writer, and the maximum communication distance.

FIG. 6 is a graph showing the relationship between the angle θ, at which the mobile terminal is held over the reader/writer, and the maximum communication distance. In FIG. 6, a line E is a characteristic of the antenna device according to the first exemplary embodiment, and a line P is a characteristic of an antenna device having the conventional structure shown in FIGS. 1A and 1B. It can be understood that, for the antenna device having the conventional structure, the maximum communication distance is extremely short in the range of 30° to about 50° of the angle θ; for the antenna device according to the present invention, the maximum communication distance can remain long over the full range of 0° to 90° (90° or more) of the angle θ.

FIG. 7A is a plan view of a magnetic core 1 included in an antenna coil according to a second exemplary embodiment, and FIG. 7B is a plan view of an antenna coil 22 according to the second embodiment.

The difference between the antenna coil 22 and the antenna coil 21 shown in FIGS. 3A and 3B is that the magnetic core 1 is formed so that one end portion thereof is thicker than the other portions.

Use of the magnetic core 1 having such a shape provides improves in communication performance, such as strengthening of the magnetic flux passing through the magnetic core 1, strengthening of magnetic coupling between the antenna coil 22 and an antenna of a communication partner, and increasing of the maximum communication distance. In particular, making the portion adjacent to the first conductor portion 11, of the magnetic core 1 thicker than the other portions increases the magnetism collection effect in the vicinity of the end portion of the circuit substrate, further improving communication performance.

While the magnetic core 1 is formed so that the entire one end portion thereof is wider (thicker) in the antenna coil 22 shown in FIG. 7, this portion may have a shape of a trapezoid whose more external portion is wider. Alternatively, the magnetic core 1 may have a shape of a butterfly so that the width is increased from the center to both end portions.

FIG. 8A is a plan view of a magnetic core 1 included in an antenna coil according to a third exemplary embodiment, and FIG. 8B is a plan view of an antenna coil 23 according to the third embodiment. The antenna coil 23 in this example includes a rectangular plate-shaped magnetic core 1 and a flexible substrate 10 on which a coil conductor are formed. The difference between the antenna coil 23 and the antenna coil 22 shown in FIG. 7B is the structure of the magnetic core 1.

The magnetic core 1 shown in FIG. 8A is formed by forming a mixture of a magnetic powder, such as a ferrite powder, and a resin material into a sheet, forming the sheet into multiple small pieces, sintering the pieces to form sintered magnetic pieces, and laminating both surfaces of the pieces using a film. Portions separated by broken lines in FIGS. 8A and 8B represent the sintered magnetic pieces. Due to such a structure, the entire magnetic core 1 has flexibility.

FIG. 9 is a drawing showing the state of the disposition of the antenna coil 23 in a mobile terminal. In this example, the antenna coil 23 is attached to the inner surface of the case 200 of the mobile terminal. Due to its flexibility, the antenna coil 23 can be disposed not only on the single plane surface within the case but also along the inner surface thereof. Thus, the antenna coil 23 can be built in cases of various shapes.

Figure 10A:
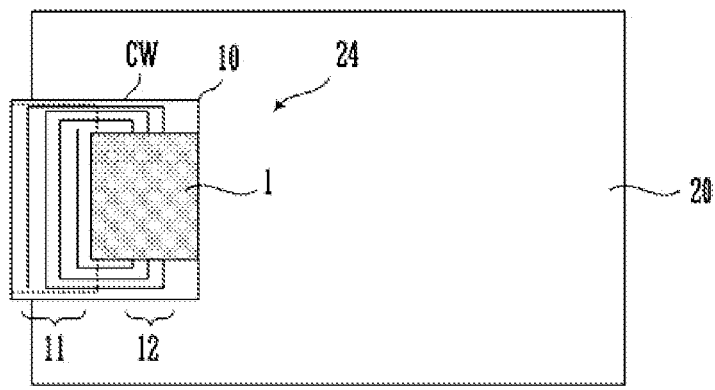
FIG. 10A is a plan view of an antenna device 104.
Figure 10B:
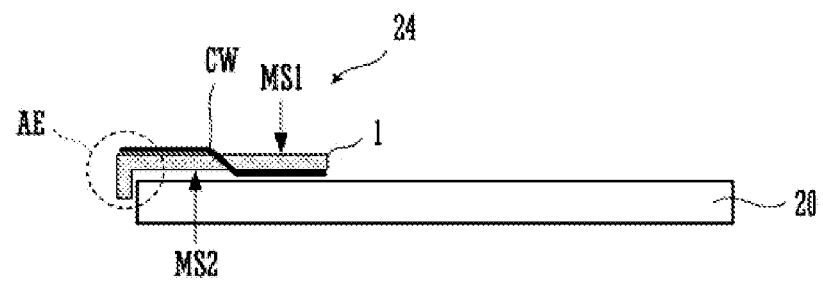
FIG. 10B is a front view thereof.

FIG. 10A is a plan view of an antenna device 104 according to a fourth exemplary embodiment, and FIG. 10B is a front view thereof.

The differences between the antenna device 104 and the antenna device 101 according to the first exemplary embodiment shown in FIGS. 3A and 3B are the configuration of an antenna coil 24 and the disposition position thereof.

While a magnetic core 1 included in the antenna device 104 according to a fourth embodiment is roughly a rectangular plate-shaped ferrite core, it has a bend-shaped portion AE formed by bending an end portion thereof adjacent to a first conductor portion 11 at a position outside an end portion of a circuit substrate 20 toward the circuit substrate 20.

Since the bend-shaped portion AE of the magnetic core 1 lies off the end portion of the circuit substrate 20, the antenna coil 24 is disposed in a position closer to the outside of the circuit substrate 20 than the position shown in FIGS. 3A and 3B. The other elements are the same as those of the first exemplary embodiment shown in FIGS. 3A and 3B.

The use of the magnetic core 1 having such a bent shape portion and the determination of the disposition position of the antenna coil in such a way can provide improvements in communication performance, such as strengthening of the magnetic flux passing through the magnetic core 1, increasing of the magnetism collection effect in the vicinity of the end portion of the circuit substrate, strengthening of magnetic coupling between the antenna coil 24 and the antenna of a communication partner, and increasing of the maximum communication-capable distance.

Figure 11:
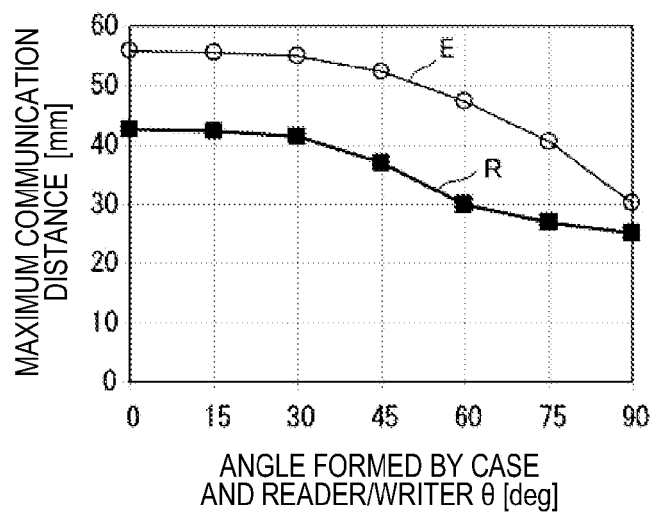
FIG. 11 is a graph showing the relationship between an angle θ, at which a mobile terminal is held over a reader/writer, and the maximum communication distance.

FIG. 11 is a graph showing the relationship between the angle θ, at which the mobile terminal is held over the reader/writer, and the maximum communication distance. In FIG. 11, a line E is a characteristic of the antenna device according to the fourth exemplary embodiment, and a line R is a characteristic of an antenna device including the antenna coil shown in FIG. 7. It is understood that the antenna device according to this embodiment can keep the maximum communication distance longer over the entire range of 0° to 90° of the angle θ than the antenna device including the antenna coil shown in FIG. 7.

While the ground electrode on or within the substrate has been shown as an example of the flat conductor in the above-mentioned embodiments, an antenna device may be formed using, as the flat conductor, a shield plate disposed on the back of the liquid crystal panel, a conductive film or conductive foil formed on the inner surface of the case, or the battery pack.

According to embodiments of the present disclosure, when the angle which the antenna device forms with the antenna of the reader/writer is in the range of 0° to 90°, the magnetic fluxes interlinked with the coil conductor in opposite directions do not equal each other, that is, the magnetic fluxes do not cancel out each other. Thus, communications can be performed stably in the range of 0° to 90° or more or in a wider range.

Also, if the magnetic core is formed using sintered magnetic pieces, flexibility can be provided to the entire antenna coil. Thus, the magnetic core can be built in the case of a built-in destination electronic apparatus, such as a mobile terminal, with a high degree of freedom.

Additionally, if the portion adjacent to the first conductor portion, of the magnetic core is made thicker than the other portions thereof, magnetic resistance is reduced, improving communication performance.

Further, if the portion adjacent to the first conductor portion, of the magnetic core is bent at a position outside the end portion of the flat conductor toward the flat conductor, magnetic resistance is reduced, improving communication performance.

That which is claimed is:
1. An antenna device comprising:
an antenna coil, the antenna coil comprising:
a plate-shaped magnetic core having first and second main surfaces, a length of the plate-shaped magnetic core being larger than a thickness of the magnetic core as measured from the first main surface to the second main surface; and
a coil conductor wound around the magnetic core; and
a flat conductor adjacent to the antenna coil, wherein
the antenna coil is provided at or proximal to an end portion of the flat conductor and on or over a surface of the flat conductor opposite to a surface thereof facing an antenna of a communication partner,
a first conductor portion of the coil conductor is adjacent to a first main surface of the magnetic core, a second conductor portion of the coil conductor is adjacent to the second main surface of the magnetic core, and said first and second conductor portions do not overlap each other in a perspective plan view of the magnetic core, the second main surface of the magnetic core faces the flat conductor, and the first conductor portion is closer to the end portion of the flat conductor than the second conductor portion.

2. The antenna device according to claim 1, wherein the first conductor portion includes plural adjacent conductor segments positioned along an area of the first main surface of the magnetic core, the second conductor portion includes plural adjacent conductor segments positioned along and adjacent to an area of the second main surface of the magnetic core that opposes the first area, each of plural turns of the coil conductor includes one segment of the first conductor portion and one segment of the second conductor portion, and the area of the first main surface and the area of the second main surface do not overlap in plan view of the magnetic core.

3. The antenna device according to claim 1, wherein the flat conductor includes first and second main surfaces joined by a side surface including the end portion, the surface of the flat conductor on or over which the antenna coil is provided is the first main flat conductor surface, and the opposite surface is the second main flat conductor surface.

4. The antenna device according to claim 3, wherein the second main surface of the magnetic core faces the first main flat conductor surface and overlaps the first main flat conductor surface in a plan view of the magnetic core and the flat conductor.

5. The antenna device according to claim 1, wherein
the magnetic core is a mixture of a magnetic powder and a resin material.

6. The antenna device according to claim 1, wherein the magnetic core is a plurality of sintered magnetic pieces.

7. The antenna device according to claim 1, wherein
a portion of the magnetic core adjacent to the first conductor portion is thicker than other portions thereof.

8. The antenna device according to claim 5, wherein
a portion of the magnetic core adjacent to the first conductor portion is thicker than other portions thereof.

9. The antenna device according to claim 6, wherein
a portion of the magnetic core adjacent to the first conductor portion is thicker than other portions thereof.

10. The antenna device according to claim 1, wherein
an end portion of the magnetic core close to the first conductor portion is bent at a position outside an end portion of the flat conductor toward the flat conductor.

11. The antenna device according to claim 5, wherein
an end portion of the magnetic core close to the first conductor portion is bent at a position outside an end portion of the flat conductor toward the flat conductor.

12. The antenna device according to claim 6, wherein
an end portion of the magnetic core close to the first conductor portion is bent at a position outside an end portion of the flat conductor toward the flat conductor.

13. The antenna device according to claim 7, wherein
an end portion of the magnetic core close to the first conductor portion is bent at a position outside an end portion of the flat conductor toward the flat conductor.

14. A mobile terminal comprising:
a case; and
the antenna device according to claim 1 contained in the case.

15. The mobile terminal according to claim 14, wherein the first conductor portion includes plural adjacent conductor segments positioned along an area of the first main surface of the magnetic core, the second conductor portion includes plural adjacent conductor segments positioned along and adjacent to an area of the second main surface of the magnetic core that opposes the first area, each of plural turns of the coil conductor includes one segment of the first conductor portion and one segment of the second conductor portion, and the area of the first main surface and the area of the second main surface do not overlap in plan view of the magnetic core.

16. The mobile terminal according to claim 14, wherein the flat conductor includes first and second main surfaces joined by a side surface including the end portion, the surface of the flat conductor on or over which the antenna coil is provided is the first main flat conductor surface, and the opposite surface is the second main flat conductor surface.

17. The mobile terminal according to claim 16, wherein the second main surface of the magnetic core faces the first main flat conductor surface and overlaps the first main flat conductor surface in a plan view of the magnetic core and the flat conductor.

18. A mobile terminal comprising:
a case; and
the antenna device according to claim 5 contained in the case.

19. A mobile terminal comprising:
a case; and
the antenna device according to claim 6 contained in the case.

20. A mobile terminal comprising:
a case; and
the antenna device according to claim 7 contained in the case.

21. A mobile terminal comprising:
a case; and
the antenna device according to claim 8 contained in the case.

22. A mobile terminal comprising:
a case; and
the antenna device according to claim 9 contained in the case.

23. A mobile terminal comprising:
a case; and
the antenna device according to claim 10 contained in the case.

24. A mobile terminal comprising:
a case; and
the antenna device according to claim 11 contained in the case.

25. A mobile terminal comprising:
a case; and
the antenna device according to claim 12 contained in the case.

26. A mobile terminal comprising:
a case; and
the antenna device according to claim 13 contained in the case.

* * * * *